May 29, 1962 E. D. MARLIN Re. 25,174

PNEUMATIC SPEED SENSING GOVERNOR

Original Filed June 11, 1958

INVENTOR.
ELMER D. MARLIN

BY

Herschel C. Omohundro
ATTORNEY

United States Patent Office

Re. 25,174
Reissued May 29, 1962

25,174

PNEUMATIC SPEED SENSING GOVERNOR

Elmer D. Marlin, Phoenix, Ariz., assignor to The Garrett Corporation, Los Angeles, Calif., a corporation of California Original No. 2,896,653, dated July 28, 1959, Ser. No. 741,426, June 11, 1958. Application for reissue Apr. 26, 1960, Ser. No. 24,862
17 Claims. (Cl. 137—54)

Matter enclosed in heavy brackets [ ] appears in the original patent but forms no part of this reissue specification; matter printed in italics indicates the additions made by reissue.

This invention relates to governors or speed controlling mechanisms. It is more particularly directed to apparatus for pneumatically controlling the speed of operation of air motors, turbines and similar fluid pressure operated devices.

In the construction and operation of high speed machinery, it has long been a problem to provide a simple, compact and dependable means for governing the operation of a prime mover such as an air or gas turbine. Apparatus heretofore employed has been complicated, heavy, cumbersome, and unsuitable for high speed operation. In some instances, parts such as springs were required to be of such strength and size to withstand the high operating pressures and speeds that they were relatively insensitive and could not control the speed of a turbine or motor within the close limits required. Such prior apparatus has also been unsuitable for use in aircraft where weight and space are at a premium.

An object of this invention, therefore, is to provide a governor or speed controlling mechanism of a simple, lightweight and compact design suitable for use in aircraft and having relatively few parts so arranged and related that very precise control can be secured at high prime mover or motor speeds.

Another object of this invention is to provide a speed controlling mechanism which can be mounted directly on the shaft or rotating element of a turbine or motor and will be of small size and light weight so that extreme sensitivity at high speeds may be secured.

Still another object of the invention is to provide a speed controlling mechanism which will operate to limit the speed of the prime mover in the event of failure of one or more of the parts of the controlling mechanism.

A further object of the invention is to provide a speed controlling mechanism for use with pneumatically operated apparatus, the mechanism having a body which provides a fluid passage, and valve means responsive to centrifugal forces to control flow through the fluid passages, the valve means being supported for movement with and relative to the body in a novel manner.

A still further object of the invention is to provide a speed controlling mechanism for use in a fluid system, the mechanism having a fluid passage forming means and balanced combination counterweight and valve means rotating in unison, the combination counterweight and valve means responding to centrifugal force to control flow through the fluid passage and consequently the operation of a fluid system.

Another object of the invention is to provide a speed controlling mechanism having a body to be secured to the end of a motor or turbine shaft and provided with ports forming part of a fluid passage, a loop-shaped frame of strap-like material being secured to the body at spaced points so that parts between the points of attachment may flex in response to centrifugal force upon rotation of the shaft, the parts of the frame between the points of attachment being provided with valve means to open and close the ports in response to variations in centrifugal force and thus control fluid flow through the fluid passage.

Other objects and advantages will be apparent from the following description of one form of the invention shown in detail on the accompanying drawing. In the drawing.

Figure 1:
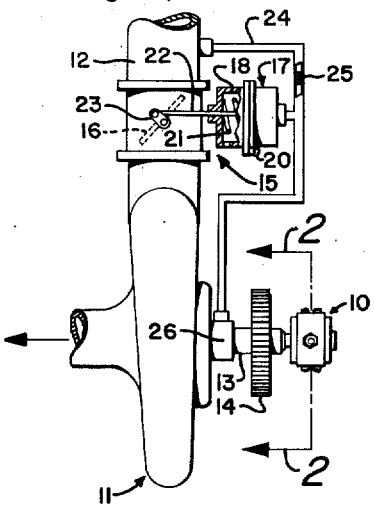
FIGURE 1 is a schematic view showing an air turbine provided with a speed controlling mechanism formed in accordance with the present invention, a pneumatic control valve being disposed in the inlet to the turbine.

Referring more particularly to the drawing, the numeral 10 designates the speed controlling mechanism in its entirety. In FIG. 1 this mechanism is shown in connection with a pneumatic turbine designated generally by the numeral 11, the turbine having an inlet conduit 12 communicating with the turbine casing and conducting air or other fluid under pressure from a suitable source thereto. The turbine contains a wheel (not shown) which responds to the energy in the compressed fluid and imparts rotary movement to the turbine shaft 13. This rotary movement may be transmitted by gear 14, or any other suitable motion transmitting means, to apparatus to be driven by the turbine.

To control the flow of motive fluid to the turbine, a valve mechanism 15 is provided in the conduit 12. This valve mechanism may be of any suitable type, a butterfly valve being shown for purpose of illustration only. The butterfly valve includes a disk 16 arranged in the conduit 12 for pivotal movement between open and closed positions in response to the operation of an actuator 17 arranged exteriorly of the conduit 12. The actuator may also be of any desired type; however, since the speed controlling mechanism illustrated is of the pneumatic type, a pneumatic actuator is illustrated.

This actuator has a casing 18 divided into pressure and ambient chambers by a diaphragm 20. The ambient chamber contains a spring or other resilient element 21 which normally urges the diaphragm 20 toward the pressure chamber, the diaphragm being coupled with the butterfly valve disk by a connecting rod 22 and crank 23. When the diaphragm is moved by the spring, or in opposition thereto, the connecting rod and crank will transmit movement to the disk 16 to cause it to move between open and closed positions. It should be obvious that through such movement of the disk 16, the flow of fluid through the conduit 12 to effect the operation of the turbine, will be governed.

Fluid under pressure is supplied to the pressure chamber of the actuator 17 from the conduit 12 at the upstream side of the valve 16 through a tube 24, this tube being provided with a restriction 25 in advance of the connection of the tube with the pressure chamber. The purpose of the restriction will be made apparent hereinafter. The tube 24 also extends to a fitting 26 secured to the side of the turbine casing and surrounding the shaft 13. This fitting constitutes a manifold the interior of which communicates with one or more openings formed in the shaft 13, such openings (not shown) communicating with a longitudinal passage 27 formed in the shaft 13. Fluid under pressure from the conduit 12 may flow through the tube 24 to the pressure chamber of the valve actuator and also through the manifold 26 to the interior of the shaft 13.

The speed controlling mechanism 10 is provided to prevent, except at desired times, the flow of pressure fluid from the hollow interior of the turbine shaft 13.

As long as this flow is prevented, fluid pressure will be applied to the diaphragm 20 to hold the butterfly disk 16 in an open position. By bleeding fluid at predetermined rates from the interior of the shaft 13, the position of the diaphragm 20 and consequently the butterfly disk 16 may be controlled. The speed controlling mechanism 10 is provided to effect this operation as a function of the speed of the shaft.

Mechanism 10 includes a body 28 which, in the present instance, is of block form having flat sides 30 and ends 31. The block is provided on one side with a projection 32 terminating in a flange 33 formed for reception by a counterbore 34 in the end of the shaft 13. The flange is also provided with diametrically opposed tongues 35 for reception by keyways formed in the end of the shaft 13. Suitable gaskets 36 are provided in the shaft to prevent the escape of fluid under pressure around the flange 33. The speed controlling mechanism may be retained in place on the shaft 13 in any suitable manner, a snap ring 37 being shown for this purpose in the present illustration. It will be obvious that, due to the engagement of the tongues and grooves in the shaft 13, the body 10 will rotate in unison with the shaft.

Figure 2:
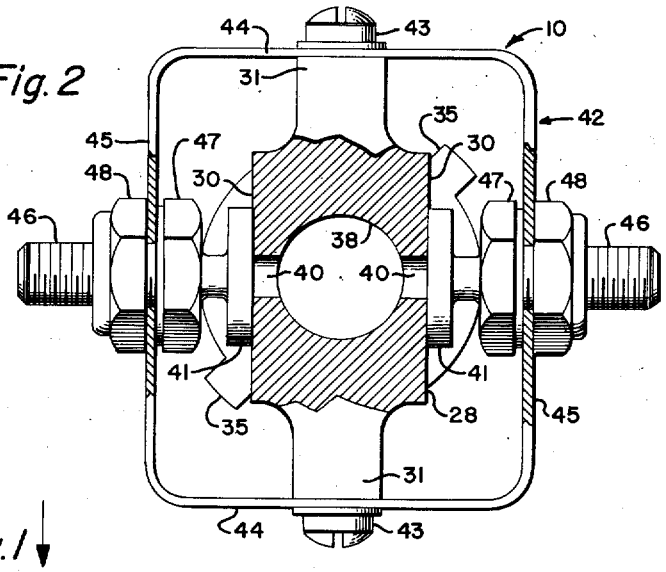
FIG. 2 is a vertical sectional view taken through the speed control mechanism shown in FIG. 1 on the plane indicated by the line 2—2 of FIG. 1, parts of the mechanism being disclosed also in elevation.
Figure 3:
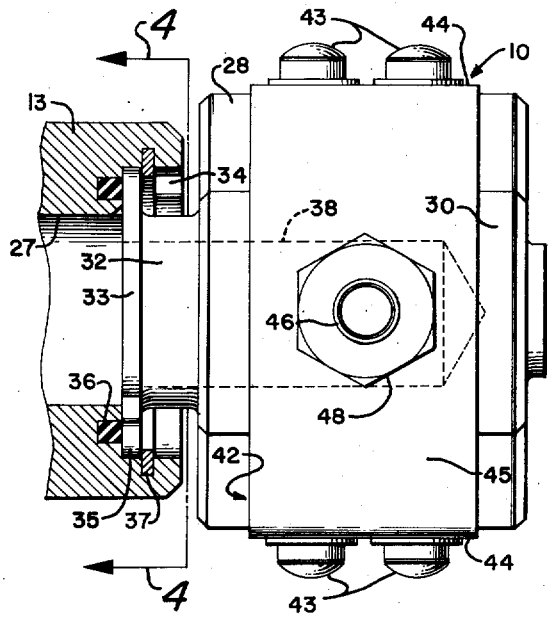
FIG. 3 is a side elevational view of the speed controlling mechanism shown in FIG. 1.
Figure 4:
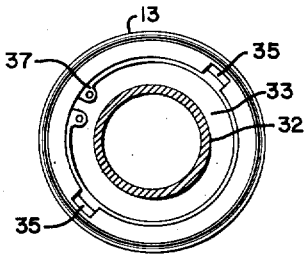
FIG. 4 is a vertical transverse sectional view taken on the plane indicated by the line 4—4 of FIG. 3.

As shown in FIGS. 2 and 3, the body [30] *28* is provided with an internal cavity 38 which opens through the flange 33 and communicates with the interior of the shaft 13. The cavity 38 is closed at the outer end of the body but communicates with a pair of ports 40 formed in opposite sides of the body, these ports extending at right angles to the axis of rotation of the shaft and body. The side surfaces to which the ports open are flat and parallel to one another. These side surfaces are engaged by poppet valves 41 to control fluid flow through the ports 40. Normally, the valves 41 are engaged with the side surfaces and prevent fluid flow from the chamber 38. When the speed of operation of the turbine increases beyond a predetermined rate, however, the valves start to move away from the side surfaces 30 to permit some of the fluid to bleed from the chamber 38 and reduce the pressure in the pressure chamber of the actuator 17. This reduction in pressure permits spring 21 to move the diaphragm and in turn to move the butterfly valve 16 toward a closed position, thus reducing the volume of air flowing to the turbine and consequently the speed of the latter. It should be obvious that the valves 41 must move far enough away from the body 28 to permit more fluid to flow from the ports 40 than can flow through the restriction 25 before the pressure will be reduced in the actuator.

The valves 41 are supported on the body 28 in a novel manner. This support is provided by an open frame member 42, which in the present illustration is of rectangular form, being constructed of strap-like material of suitable thickness and resiliency. The frame is secured to the body by screws 43 extending through openings in the end portions 44 of the frame. The plane of the frame is disposed at right angles to the axis of rotation of the body and shaft, and when the body is revolved the frame will rotate in such plane. The side pieces 45 of the frame have openings for the reception of screws 46 projecting from the outer surfaces of the poppet valves 41. These screws receive nuts 47 and 48 which engage the inner and outer sides of the portions 45 of the frame and clamp the screws thereto. By adjusting the nuts on the screws 46, the spacing between the faces of the poppet valves 41 and the side members 45 of the frame may be varied. This spacing determines the force of engagement of the poppet valves with the sides of the body 28 and the resistance to fluid flow from the ports 40 when the device is not in operation.

The frame 42 is of spring-type material so that it will permit outward movement of the valves 41 under predetermined conditions and return these valves to engagement with the body when the conditions are changed in a certain manner. It will be obvious that the poppet valves, the screws and the nuts possess a weight or mass which when the body is revolved will exert a centrifugal force. This force will be opposed by the resiliency of the frame 42. As the speed of the shaft increases, the centrifugal force will also increase, until the valves 41 move away from the body 28 and permit fluid to escape from the ports 40. By properly calculating the weight of the valves 41, screws 46, and nuts 47 and 48, and the positions of the valves on the frame, the distance moved by the valves at predetermined rates of operation can be predicted. It will be obvious that by this means the speed of rotation of the shaft 13 can also be determined. The turbine speed may be varied through the adjustment of the valves on the frame 42.

One of the features of this construction is that the valves, in moving to control the escape of fluid and the speed of operation of the turbine, are completely disengaged from the body. They do not slide on or engage anything other than the supporting frame, and friction is thereby avoided. Accurate control may therefore be secured.

Another feature of the invention is the location of the speed controlling mechanism on the turbine shaft at the axis of rotation where the centrifugal force will be slightest. This arrangement permits the mechanism to be made relatively light in weight and still secure accurate operation.

I claim:

1. In a governor: a body formed for operative engagement with a rotatable member for rotary movement therewith, said body having ports forming a fluid passage therein; frame means secured at spaced points to said body for rotation therewith, a portion of said frame means between said points of attachment being resilient and tending to *flex* [move] away from *the axis of rotation of* said body in response to centrifugal force *of said frame means* upon rotation of said body and frame means; and valve means mounted on the intermediate portion of said frame means for movement therewith, said valve means registering with said ports and serving to control fluid flow therethrough in response to variations in centrifugal force *of said frame and valve means* due to changes in rate of rotation of said body and frame means.

2. In a governor: a body formed for operative engagement with a rotatable member for rotary movement therewith, said body forming a fluid pressure chamber with inlet and outlet ports; resilient means secured to said body at opposite sides of one of said ports, said resilient means rotating with said body *and being disposed to move laterally away from the axis of rotation of said body in response to centrifugal force*; and a valve element carried by said resilient means in registration with said one port, said resilient means urging said valve means toward port closing position, centrifugal force *of said resilient means and said valve means* tending to flex said resilient means and move said valve toward a port opening position.

3. In a governor: a body formed for operative engagement with a rotatable member for rotary movement therewith, said body forming a fluid pressure chamber with inlet and outlet ports; strap-like resilient means secured to said body at opposite sides of one of said ports, said resilient means rotating with said body *and being disposed to move laterally away from the axis of rotation of said body in response to centrifugal force*; and a valve element carried by said resilient means in registration with said one port, said resilient means urging said valve means toward port closing position, centrifugal force tending to flex said resilient means and move said valve toward a port opening position.

4. In a governor: a body formed for operative engagement with a rotatable member for rotary movement therewith, said body forming a fluid pressure chamber with inlet and outlet ports; a strap-like resilient means secured at the ends to said body at opposite sides of one of said ports, the intermediate portion of said resilient means being spaced from said body *and movable substantially at right angles to the axis of rotation of said body*; and a valve element carried by the intermediate portion of said resilient means in registration with said one port, said resilient means urging said valve means toward port closing position, centrifugal force tending to flex said resilient means *laterally away from the axis of rotation of said body* and move said valve element toward a port opening position.

5. In a governor: a body formed for operative engagement with a rotatable member for rotary movement therewith, said body forming a fluid pressure chamber with inlet and outlet ports; a loop-type resilient member secured at opposite points to said body, said resilient member rotating with said body; and a valve element carried by said resilient member intermediate the points attachment thereof to said body, said valve element being disposed in registration with one of said ports and moved toward and away therefrom in response to variations in centrifugal force resulting from rotation of said body and resilient member.

6. In a governor: a body formed for operative engagement with a rotatable member for rotary movement therewith, said body forming a fluid pressure chamber with inlet and outlet ports; an open, loop-shaped, resilient member secured at opposite points to said body, the plane of said member being normal to the axis of rotation of said body, said member rotating with said body; and a valve element carried by said member intermediate the points of attachment thereof to said body, said valve element being disposed in registration with one of said ports and moved toward and away therefrom in response to variations in centrifugal force resulting from rotation of said body and resilient member.

7. In a governor: a body formed for operative engagement with a rotatable member for rotary movement therewith, said body forming a fluid pressure chamber with inlet and outlet ports; an open, loop-shaped, resilient member secured at opposite points to said body, the plane of said member being normal to the axis of rotation of said body, said member rotating with said body; and valve elements carried by said member on opposite sides between the points of attachment thereof to said body, said valve elements being disposed in registration with certain of said ports and moved toward and away therefrom in response to variations in centrifugal force resulting from rotation of said body and resilient member.

8. In a governor: a body formed for operative engagement with a rotatable member for rotary movement therewith, said body forming a fluid pressure chamber with inlet and outlet ports, a pair of ports being disposed on opposite sides of said body; an open loop-shaped resilient member secured at opposite points to opposite ends of said body, the plane of siad member being normal to the axis of rotation of said body, said member rotating with said body; and valve elements carried by said member on opposite sides between the points of attachment thereof to said body, said valve elements being disposed in registration with said pair of ports and moved toward and away therefrom in response to variations in centrifugal force resulting from rotation of said body and resilient member.

9. In a governor: a body formed for operative engagement with a rotatable member for rotary movement therewith, said body forming a fluid pressure chamber with inlet and outlet ports, a pair of ports being disposed on opposite sides of said body; an open loop-shaped resilient member secured at opposite points to opposite ends of said body, the plane of said member being normal to the axis of rotation of said body, said member rotating with said body; valve elements carried by said member on opposite sides between the points of attachment thereof to said body, said valve elements being disposed in registration with said pair of ports and moved toward and away therefrom in response to variations in centrifugal force resulting from rotation of said body and resilient member; and means for adjusting said valve elements toward and away from said body on said member.

10. In a governor: a body formed for operative engagement with a rotatable member for rotary movement therewith, said body forming a fluid pressure chamber with inlet and outlet ports, a pair of ports being disposed on opposite sides of said body; an endless rectangular open-sided frame of resilient strap-type material secured at opposite ends to the ends of said body; and valve elements adjustably secured to opposite sides of said frame, the resilience of the latter serving to urge said valve elements into engagement with the sides of said body to close said pair of ports, centrifugal force caused by the rotation of said body and frame serving to move said valve elements away from said body and open said ports.

*11. In a governor: a body formed for operative engagement with a rotatable member for rotary movement therewith; strap-type means forming a substantially rectangular frame secured adjacent its ends to said body and providing spaced elongated resilient portions between the points of attachment, the longitudinal axes of said portions being disposed in a plane extending transversely of the axis of rotation of said body; and means carried by the spaced resilient portions of said frame for controlling fluid flow through an orifice means in response to movement caused by centrifugal force resulting from the rotation of said body.*

*12. In a governor: a body formed for operative engagement with a rotatable member for rotary movement therewith; frame means secured at spaced points on said body for rotation therewith, a portion of said frame means between said points of attachment being resilient and tending to flex away from the axis of rotation in response to centrifugal force upon rotation of said body and frame means; and flyweight means carried by said frame means, said flyweight means being operative in response to movement of said frame means to control fluid flow through an orifice means.*

*13. In a governor: a body formed for operative engagement with a rotatable member for rotary movement therewith; frame means secured at spaced points on said body for rotation therewith, said frame means providing spaced resilient portions between said points of attachment, said portions tending to flex away from the axis of rotation in response to centrifugal force upon rotary movement of said body and frame means; and flyweight means carried by said spaced resilient portions, said flyweight means being operative in response to movement of said resilient portions of the frame means to control fluid flow through an orifice means.*

*14. In a governor: a body formed for operative engagement with a rotatable member for rotary movement therewith; frame means secured at spaced points on said body for rotation therewith, said frame means providing a pair of substantially parallel resilient portions extending between the points of attachment and tending to move away from the axis of rotation in response to centrifugal force upon rotary movement of said body and frame means; and means adjustably secured to each of the resilient portions of said frame means to serve as flyweights, said flyweights being operative upon movement of said resilient portions of the frame to control fluid flow through an orifice means, the adjustment of said flyweight means serving to change the rate of rotation of said body and frame means at which control of fluid flow through the orifice is initiated.*

*15. In a governor: a body formed for operative engagement with a rotatable member for rotary movement therewith; frame means secured at spaced points on said body for rotation therewith, said frame means providing a pair of resilient portions extending in spaced parallel relation between the points of attachment of said frame means; flyweight means mounted on said resilient portions said flyweight means tending to move away from the axis*

*of rotation in response to centrifugal force upon rotary movement of said body and frame means; and control means disposed for actuation by movement of said flyweight means in response to centrifugal force to control fluid flow through an orifice means.*

*16. In a governor: a body formed for operative engagement with a rotatable member for rotary movement therewith; means forming a plurality of resilient sections mounted at their ends on said body; flyweight means secured to said resilient sections adjacent the intermediate portions thereof, rotation of said member and body tending to flex said resilient sections and move said flyweight means away from the axis of rotation; and port controlling means disposed for actuation in response to the movement of said flyweight means by centrifugal force to control fluid flow through an orifice means.*

*17. In a governor: a body formed for operative engagement with a rotatable member for rotary movement therewith; means secured at spaced points on said body for rotation therewith, a portion of said means between*

*said points of attachment being resilient and tending to flex away from the axis of rotation in response to centrifugal force upon rotation of said body and frame means; flyweight means carried by the resilient portion of said means for movement therewith; and port controlling means operatively connected with said flyweight means for actuation in response to the movement thereof by centrifugal force to control fluid flow through an orifice means.*

References Cited in the file of this patent or the original patent

UNITED STATES PATENTS

| | | |
|---|---|---|
| Re. 10,559 | Malcolmson | Feb. 10, 1885 |
| 162,219 | Chase | Apr. 20, 1875 |
| 677,014 | Buck | June 25, 1901 |
| 2,599,872 | Slonneger | June 10, 1952 |
| 2,645,237 | Wheeler | July 14, 1953 |
| 2,665,711 | Parks | Jan. 12, 1954 |
| 2,782,768 | Rued | Feb. 26, 1957 |